US011972728B2

(12) United States Patent
Lee et al.

(10) Patent No.: US 11,972,728 B2
(45) Date of Patent: Apr. 30, 2024

(54) LIGHT EMITTING DISPLAY DEVICE AND DRIVING METHOD THEREOF

(71) Applicant: LG DISPLAY CO., LTD., Seoul (KR)

(72) Inventors: Jin Woo Lee, Paju-si (KR); Yi Yeon Hwang, Paju-si (KR); Hee Young Chae, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/050,998

(22) Filed: Oct. 30, 2022

(65) Prior Publication Data

US 2023/0215363 A1 Jul. 6, 2023

(30) Foreign Application Priority Data

Dec. 30, 2021 (KR) ........................ 10-2021-0193364

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2320/02* (2013.01); *G09G 2320/0233* (2013.01); *G09G 2320/045* (2013.01); *G09G 2330/028* (2013.01)

(58) Field of Classification Search
CPC ......... G09G 3/3233; G09G 2300/0426; G09G 2300/0819; G09G 2300/0842; G09G 2330/028; G09G 2320/02; G09G 2320/0233; G09G 2320/045; G09G 2310/0251; G09G 2330/025; G09G 3/20; G09G 3/3208; G09G 3/3225; G09G 3/36; G09G 2320/0247; H10K 59/35; H10K 50/805; H10K 59/121
See application file for complete search history.

(56) References Cited

U.S. PATENT DOCUMENTS

| | | | | |
|---|---|---|---|---|
| 7,916,102 B2 * | 3/2011 | Chung | G09G 3/3233 | 345/82 |
| 9,658,710 B2 * | 5/2017 | Yang | G06F 3/042 | |
| 10,325,553 B2 * | 6/2019 | Hu | G09G 3/3291 | |
| 11,222,587 B2 * | 1/2022 | Toyomura | G09G 3/3233 | |
| 11,348,521 B2 * | 5/2022 | Cho | G09G 3/3233 | |
| 11,367,393 B2 * | 6/2022 | Yana | G09G 3/3233 | |
| 2004/0100203 A1 * | 5/2004 | Kobayashi | G09G 3/3233 | 315/169.3 |
| 2010/0220038 A1 * | 9/2010 | Chung | G09G 3/3233 | 345/76 |
| 2016/0196783 A1 * | 7/2016 | Hu | G09G 3/3258 | 345/77 |

* cited by examiner

*Primary Examiner* — Mihir K Rayan
(74) *Attorney, Agent, or Firm* — POLSINELLI PC

(57) ABSTRACT

A light emitting display device includes a display panel including a subpixel, and a driver configured to drive the display panel, and in the subpixel, initialization of both ends of an organic light emitting diode is performed simultaneously with writing of a data voltage.

10 Claims, 8 Drawing Sheets

LIGHT EMITTING DISPLAY DEVICE AND DRIVING METHOD THEREOF

CROSS-REFERENCE TO RELATED APPLICATION

This application claims the priority of Korean Patent Application No. 10-2021-0193364 filed on Dec. 30, 2021, which is hereby incorporated by reference in its entirety.

BACKGROUND

Field of the Disclosure

The present disclosure relates to a light emitting display device and a driving method thereof.

Description of the Background

In accordance with development of information technology, the market for display devices as a medium interconnecting users and information is expanding. As such, use of display devices such as a light emitting display (LED) device, a quantum dot display (QDD) device, a liquid crystal display (LCD) device and the like is increasing.

The above-mentioned display devices include a display panel including subpixels, a driver configured to output a drive signal for driving the display panel, and a power supply configured to generate electric power to be supplied to the display panel or the driver.

When drive signals, for example, scan signals and data signals, are supplied to subpixels formed at a display panel in a display device as mentioned above, selected ones of the subpixels transmit light or directly emit light and, as such, the display device may display an image.

SUMMARY

The present disclosure is to provide a light emitting display device and a driving method thereof in which both ends of an organic light emitting diode are initialized by the same voltage simultaneously with writing of a data voltage, thereby being capable of preventing or reducing a problem in which a large amount of current flows due to generation of a high voltage difference during driving.

Additional advantages and features of the disclosure will be set forth in part in the description which follows and in part will become apparent to those having ordinary skill in the art upon examination of the following or may be learned from practice of the disclosure. Other advantages of the present disclosure may be realized and attained by the structure particularly pointed out in the written description and claims hereof as well as the appended drawings.

To achieve these and other advantages and in accordance with the present disclosure, as embodied and broadly described herein, a light emitting display device includes a display panel including a subpixel, and a driver configured to drive the display panel, wherein, in the subpixel, initialization of both ends of an organic light emitting diode thereof is performed simultaneously with writing of a data voltage.

The both ends of the organic light emitting diode may be initialized by first power of a high voltage level.

The initialization of the both ends of the organic light emitting diode may be performed by a switching transistor configured to interconnect an anode and a cathode of the organic light emitting diode.

The subpixel may include a first switching transistor configured to write the data voltage, and a second switching transistor configured to initialize the both ends of the organic light emitting diode. The first switching transistor and the second switching transistor may be connected in common to one gate line at gate electrodes thereof.

The organic light emitting diode may be connected, at an anode thereof, to a first power line transmitting first power of a high voltage level while being connected, at a cathode thereof, to a first electrode of a driving transistor configured to generate driving current required for driving of the organic light emitting diode.

The subpixel may include a capacitor configured to store the data voltage, the organic light emitting diode having an anode connected to a first power line transmitting the first power of the high voltage level, a first switching transistor having a gate electrode connected to a gate line, a first electrode connected to a data line, and a second electrode connected to one end of the capacitor, a second switching transistor having a gate electrode connected to the gate line, a first electrode connected to the anode of the organic light emitting diode, and a second electrode connected to a cathode of the organic light emitting diode, and a driving transistor having a gate electrode connected to the second electrode of the first switching transistor and the one end of the capacitor, a first electrode connected to the cathode of the organic light emitting diode, and a second electrode connected to the other end of the capacitor and a second power line.

In another aspect of the present disclosure, there is provided a driving method of a light emitting display device including a subpixel including an organic light emitting diode connected, at an anode thereof, to a first power line transmitting first power of a high voltage level and connected, at a cathode thereof, to a first electrode of a driving transistor configured to generate driving current. The driving method includes initializing both ends of the organic light emitting diode by the first power of the high voltage level simultaneously with storing a data voltage in a capacitor included in the subpixel, and enabling the organic light emitting diode to emit light based on the driving current generated from the driving transistor.

The initializing may include turning on a first switching transistor included in the subpixel, turning on a second switching transistor included in the subpixel simultaneously with storing a data voltage in the capacitor, and initializing the both ends of the organic light emitting diode by the first power of the high voltage level.

The enabling the organic light emitting diode to emit light may include turning off the first switching transistor and the second switching transistor, driving the driving transistor based on the data voltage, and enabling the organic light emitting diode to emit light based on the driving current generated from the driving transistor.

In accordance with the exemplary aspects of the present disclosure, there is an effect in that both ends of an organic light emitting diode are initialized by the same voltage simultaneously with writing of a data voltage and, as such, it may be possible to prevent or reduce a problem in which a large amount of current flows due to generation of a high voltage difference during driving. In addition, in accordance with the exemplary aspects of the present disclosure, it may be possible to minimize a problem of a degradation in display quality such as abrupt brightness increase, flickering, etc. Furthermore, in accordance with the exemplary aspects of the present disclosure, a transistor for writing of a data voltage and a transistor for initialization of both ends of an organic light emitting diode may be controlled by one gate line and, as such, it may be possible to prevent a problem of an increase in bezel occurring when a device required for initialization is configured.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure.

In the drawings.

DETAILED DESCRIPTION

A display device according to an exemplary aspect of the present disclosure may be implemented as a television, an image player, a personal computer (PC), a home theater, an automobile electric device, a smartphone, etc., without being limited thereto. The display device according to the exemplary aspect of the present disclosure may be implemented as a light emitting display (LED) device, a quantum dot display (QDD) device, a liquid crystal display (LCD) device, etc. However, the following description will be given in conjunction with, for example, a light emitting display device configured to directly emit light based on an inorganic light emitting diode or an organic light emitting diode, for convenience of description.

Although a subpixel, which will be described hereinafter, will be described in conjunction with an example in which the subpixel includes an n-type thin film transistor, the subpixel may be implemented to include a p-type thin film transistor or a thin film transistor having a type in which both the n type and the p type are present. The thin film transistor may be a triple-electrode element including a gate, a source and a drain. The source is an electrode configured to supply a carrier to the transistor. The carrier in the thin film transistor first flows from the source. The drain is an electrode from which the carrier is discharged from the thin film transistor to an exterior of the thin film transistor. That is, the carrier in the thin film transistor flows from the source to the drain.

In the case of a p-type thin film transistor, a source voltage has a higher level than a drain voltage such that a hole may flow from a source to a drain because the hole is a carrier. In the p-type thin film transistor, current flows from the source to the drain because the hole flows from the source to the drain. Conversely, in an n-type thin film transistor, a source voltage has a lower level than a drain voltage such that an electron may flow from a source to a drain because the electron is a carrier. In the n-type thin film transistor, current flows from the drain to the source because the electron flows from the source to the drain. In a thin film transistor, however, a source and a drain may be interchanged in accordance with voltages applied thereto. Taking into consideration such conditions, one of the source and the drain will be referred to as a "first electrode", and the other of the source and the drain will be referred to as a "second electrode".

Figure 1:
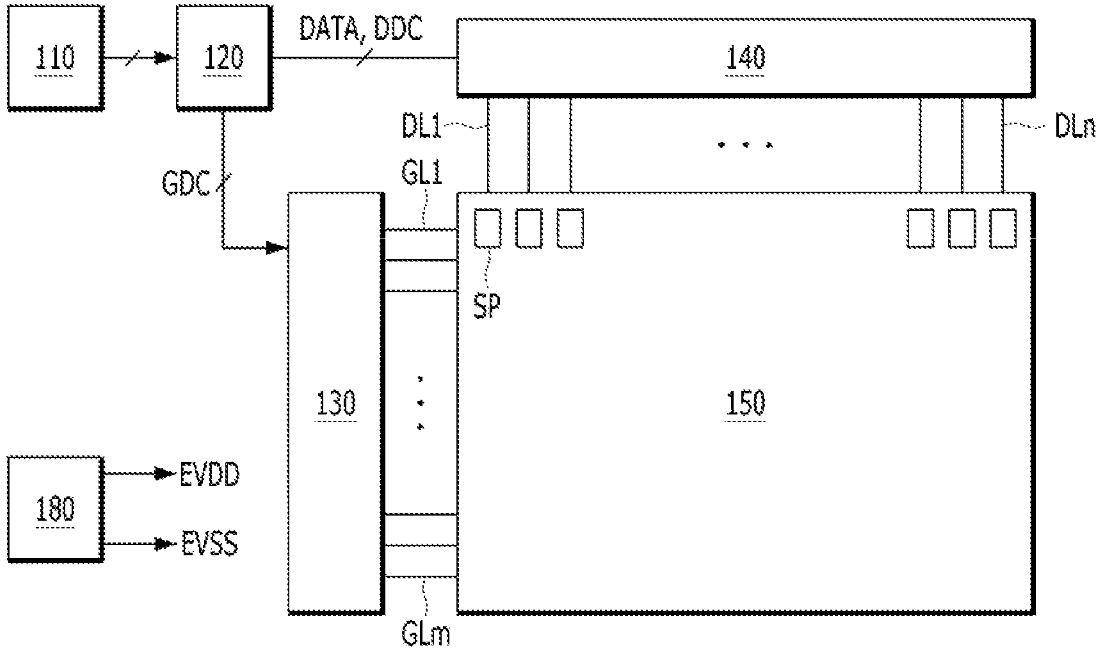
FIG. 1 is a block diagram schematically showing a light emitting display device.
Figure 2:
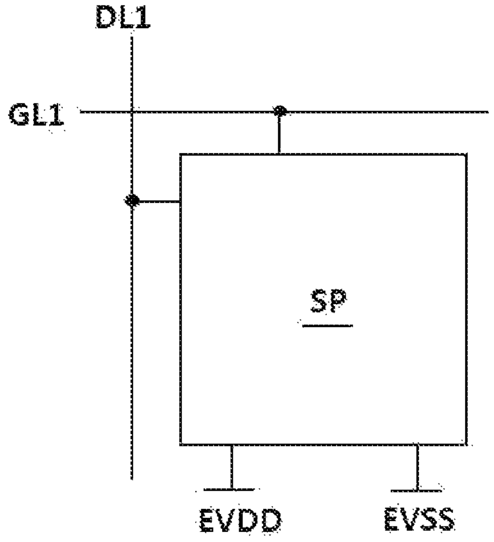
FIG. 2 is a diagram schematically showing a subpixel shown in FIG. 1.

FIG. 1 is a block diagram schematically showing a light emitting display device. FIG. 2 is a diagram schematically showing a subpixel shown in FIG. 1.

As shown in FIGS. 1 and 2, the light emitting display device may include an image supplier 110, a timing controller 120, a scan driver 130, a data driver 140, a display panel 150, a power supply 180, etc.

The image supplier 110 (a set or a host system) may output various driving signals together with an image data signal supplied from an exterior thereof or an image data signal stored in an inner memory thereof. The image supplier 110 may supply a data signal and various driving signals to the timing controller 120.

The timing controller 120 may output a gate timing control signal GDC for control of an operation timing of the scan driver 130, a data timing control signal DDC for control of an operation timing of the data driver 140, various synchronization signals (a vertical synchronization signal Vsync and a horizontal synchronization signal Hsync), etc. The timing controller 120 may supply a data signal DATA supplied from the image supplier 110 together with the data timing signal DDC to the data driver 140. The timing controller 120 may take the form of an integrated circuit (IC) and, as such, may be mounted on a printed circuit board, without being limited thereto.

The scan driver 130 may output a scan signal (or a scan voltage) in response to the gate timing control signal GDC supplied from the timing controller 120. The scan driver 130 may supply a scan signal to the subpixels included in the display panel 150 through gate lines GL1 to GLm. The scan driver 130 may take the form of an IC or may be directly formed on the display panel 150 in a gate-in-panel manner, without being limited thereto.

The data driver 140 may sample and latch a data signal DATA in response to the data timing control signal DDC supplied from the timing controller 120, may convert the resultant data signal, which has a digital form, into a data voltage having an analog form, based on a gamma reference voltage, and may output the data voltage. The data driver 140 may supply the data voltage to the subpixels included in the display panel 150 through data lines DL1 to DLn. The data driver 140 may take the form of an IC and, as such, may be mounted on the display panel 150 or may be mounted on a printed circuit board, without being limited thereto.

The power supply 180 may generate first power of a high-level voltage and second power of a low-level voltage based on an external input voltage supplied from an exterior thereof, and may output the first power and the second power through a first power line EVDD and a second power line EVSS. The power supply 180 may generate and output not only the first power and the second power, but also a voltage (for example, a gate voltage including a gate-high voltage and a gate-low voltage) required for driving of the scan driver 130, a voltage (a drain voltage including a drain voltage and a half drain voltage) required for driving of the data driver 140, etc.

The display panel 150 may display an image, corresponding to the driving signal including the scan signal and the data voltage, the first power, the second power, etc. The subpixels of the display panel 150 may directly emit light. The display panel 150 may be fabricated based on a substrate having stiffness or flexibility, such as glass, silicon, polyimide or the like. The subpixels, which emit light, may be constituted by red, green and blue subpixels or red, green, blue and white subpixels.

For example, one subpixel SP may include a pixel circuit connected to a first data line DL1, a first gate line GL1, a first power line EVDD and a second power line EVSS while including a switching transistor, a driving transistor, a capacitor, an organic light emitting diode, etc. The subpixel SP, which is used in the light emitting display device, has a complex circuit configuration because the subpixel SP directly emits light. Furthermore, a compensation circuit configured to compensate for degradation of not only the organic light emitting diode, which emits light, but also the driving transistor configured to supply, to the organic light emitting diode, driving current required for driving of the organic light emitting diode, etc. is also diverse. For convenience of illustration, however, the subpixel SP is simply shown in the form of a block.

Meanwhile, in the above description, the timing controller 120, the scan driver 130, the data driver 140, etc. have been described as having individual configurations, respectively. However, one or more of the timing controller 120, the scan driver 130 and the data driver 140 may be integrated into one IC in accordance with an implementation type of the light emitting display device.

Figure 3:
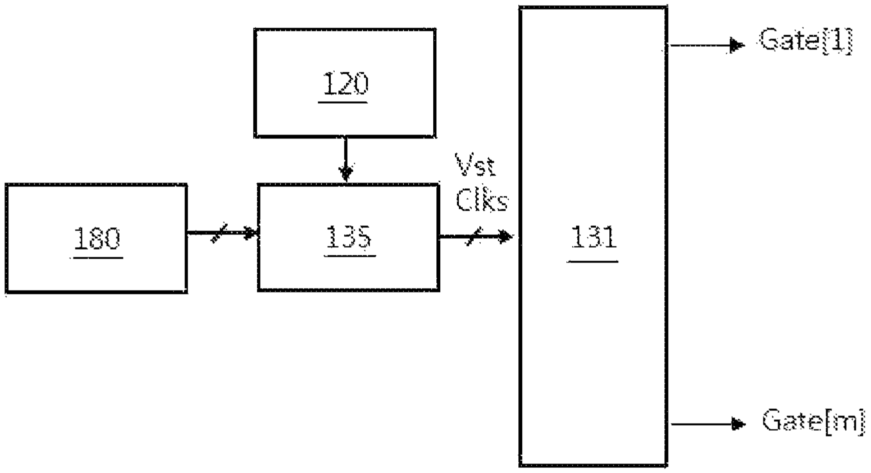
FIGS. 3 and 4 are views explaining a configuration of a gate-in-panel type scan driver.
Figure 4:
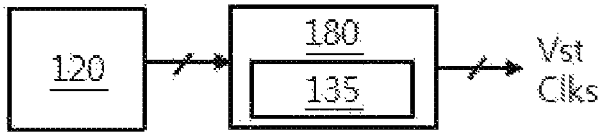

FIGS. 3 and 4 are views explaining a configuration of a gate-in-panel type scan driver. FIG. 5 is a view showing a disposition example of the gate-in-panel type scan driver.

As shown in FIG. 3, the gate-in-panel type scan driver, which is designated by reference numeral "130", may include a shift register 131 and a level shifter 135. The level shifter 135 may generate clock signals Clks and a start signal Vst based on signals and voltages output from a timing controller 120 and a power supply 180. The clock signals Clks may be generated under the condition that the clock signals Clks have K different phases (K being an integer of 2 or greater), such as 2-phase, 4-phase, 8-phase, etc.

The shift register 131 may operate based on the signals Clks and Vst output from the level shifter 135, and may output scan signals Scan[1] to Scan[m] capable of turning on or off transistors formed at a display panel. The shift register 131 may be formed on the display panel in a gate-in-panel manner in the form of a thin film.

As shown in FIGS. 3 and 4, the level shifter 135 may be independently formed in the form of an IC or may be internally included in the power supply 180, differently from the shift register 131. However, this configuration is only illustrative, and the exemplary aspects of the present disclosure are not limited thereto.

Figure 5A:
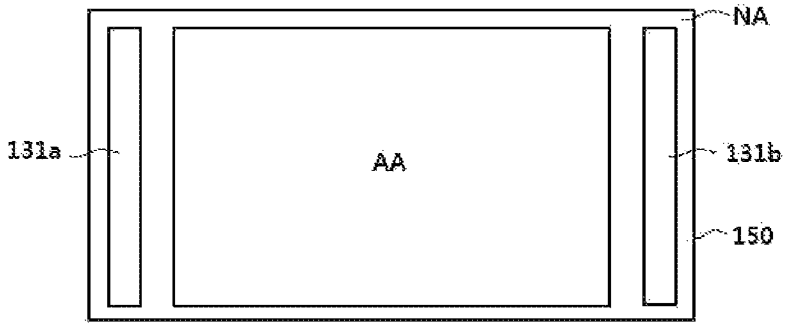
FIGS. 5A and 5B are views showing disposition examples of the gate-in-panel type scan driver.
Figure 5B:
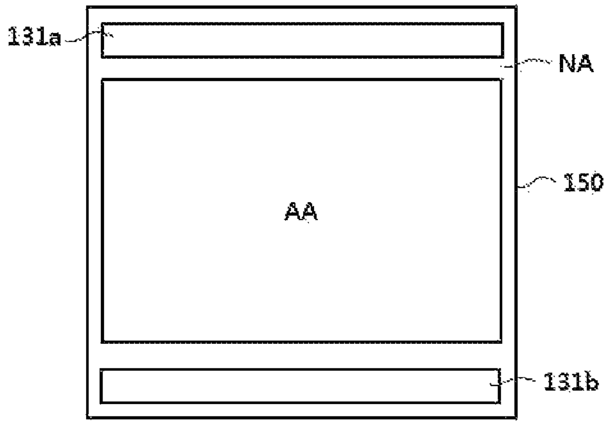

As shown in FIGS. 5A and 5B, in a gate-in-panel type scan driver, shift registers 131*a* and 131*b*, which output scan signals, may be disposed in a non-display area NA of a display panel 150. The shift registers 131*a* and 131*b* may be disposed in left and right non-display areas NA of the display panel 150, as shown in FIG. 5A, or may be disposed in upper and lower non-display areas NA of the display panel 150, as shown in FIG. 5B. Meanwhile, although the shift registers 131*a* and 131*b* have been shown and described in FIGS. 5A and 5B as being disposed in the non-display area NA, the exemplary aspects of the present disclosure are not limited thereto.

Figure 6:
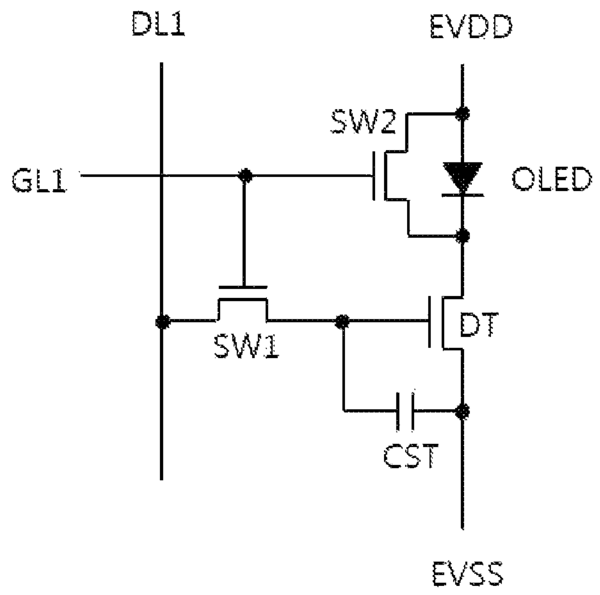
FIG. 6 is a circuit diagram of a circuit configuration of a subpixel according to an exemplary aspect of the present disclosure.
Figure 7:
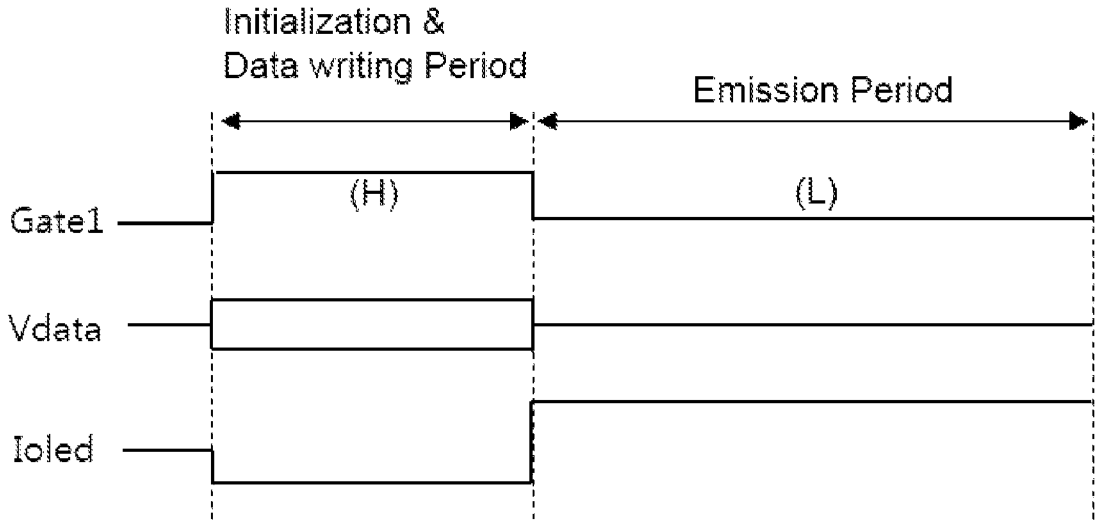
FIG. 7 is a waveform diagram explaining a driving method of a subpixel according to an exemplary aspect of the present disclosure.
Figure 8:
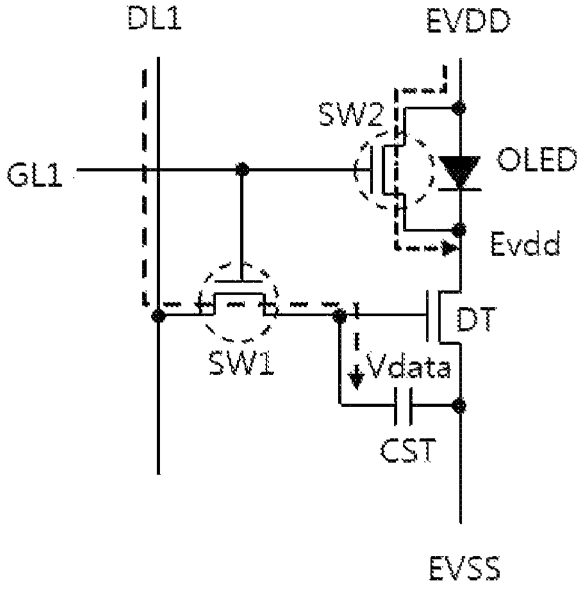
FIGS. 8 and 9 are circuit diagrams showing operation states of a device according to the driving method of FIG. 7.
Figure 9:
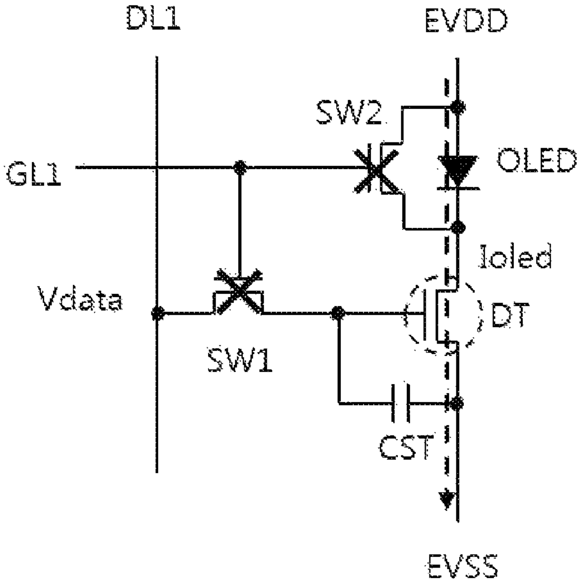

FIG. 6 is a circuit diagram of a circuit configuration of a subpixel according to an exemplary aspect of the present disclosure. FIG. 7 is a waveform diagram explaining a driving method of a subpixel according to an exemplary aspect of the present disclosure. FIGS. 8 and 9 are circuit diagrams showing operation states of a device according to the driving method of FIG. 7.

As shown in FIG. 6, in accordance with the exemplary aspect of the present disclosure, the subpixel may include a first switching transistor SW1, a second switching transistor SW2, a driving transistor DT, a capacitor CST, and an organic light emitting diode OLED.

The first switching transistor SW1 may be connected, at a gate electrode thereof, to a first gate line GL1 while being connected, at a first electrode thereof, to a first data line DL1 and connected, at a second electrode thereof, to a gate electrode of the driving transistor DT and one end of the capacitor CST. The first switching transistor SW1 may function to transmit, to a first electrode of the capacitor CST, a data voltage applied thereto through the first data line DL1.

The second switching transistor SW2 may be connected, at a gate electrode thereof, to the first gate line GL1 while being connected, at a first electrode thereof, to a first power line EVDD and an anode of the organic light emitting diode OLED and connected, at a second electrode thereof, to a cathode of the organic light emitting diode OLED. That is, the first switching transistor SW1 and the second switching transistor SW2 may be connected in common to the first gate line GL1 at the gate electrodes thereof. The second switching transistor SW2 may function to interconnect the anode and the cathode of the organic light emitting diode OLED in order to initialize both ends of the organic light emitting diode OLED.

The driving transistor DT may be connected, at the gate electrode thereof, to the second electrode of the first switching transistor SW1 and one end of the capacitor CST while being connected, at a first electrode thereof, to the cathode of the organic light emitting diode OLED and connected, at a second electrode thereof, to the other end of the capacitor CST and a second power line EVS S. The driving transistor DT may function to generate driving current, corresponding to a data voltage stored in the capacitor CST.

The capacitor CST may be connected, at one end thereof, to the second electrode of the first switching transistor SW1 and the gate electrode of the driving transistor DT while being connected, at the other end thereof, to the second electrode of the driving transistor DT and the second power line EVSS. The capacitor CST may function to store a data voltage for driving of the driving transistor DT.

The organic light emitting diode OLED may be connected, at the anode thereof, to the first power line EVDD and the first electrode of the second switching transistor SW2 while being connected, at the cathode thereof, to the second electrode of the second switching transistor SW2 and the first electrode of the driving transistor DT. The organic light emitting diode OLED may function to emit light, corresponding to operation (driving current) of the driving transistor DT.

The subpixel according to the exemplary aspect of the present disclosure may perform degradation estimation and compensation for the organic light emitting diode OLED, the driving transistor DT, etc. internally included in the subpixel based on an algorithm internally included in a timing controller, without separate sensing for the organic light emitting diode OLED, the driving transistor DT, etc.

As shown in FIG. 7, the subpixel according to the exemplary aspect of the present disclosure may operate in an order of an initialization and data writing period and an emission period.

The initialization and data writing period is a period for storing a data voltage in the capacitor CST of the subpixel and, at the same time, initializing both ends of the organic light emitting diode OLED.

The emission period is a period for driving the driving transistor DT based on the data voltage stored in the capacitor CST of the subpixel, thereby enabling the organic light emitting diode OLED to emit light.

A first gate signal Gate1 may be applied at a level of a gate-high voltage H during the initialization and data writing period, and may be applied at a level of a gate-low voltage L during the emission period. The gate-high voltage H may represent a turn-on voltage capable of turning on the switching transistors included in the subpixel, whereas the gate-low voltage L may represent a turn-off voltage capable of turning off the switching transistors.

A data voltage Vdata may be applied during the initialization and data writing period without being applied during the emission period. The data voltage Vdata may be output from a data driver, and may be configured to enable the organic light emitting diode OLED to emit light at a particular brightness (a particular grayscale).

As shown in FIGS. 7 and 8, when the first gate signal Gate1 of the gate-high voltage H is applied through the first gate line GL1 during the initialization and data writing period, the first switching transistor SW1 and the second switching transistor SW2 may be turned on.

As the first switching transistor SW1 is turned on, the data voltage Vdata applied through the first data line DL1 may be transmitted to one end of the capacitor CST. In addition, as the second switching transistor SW2 is turned on, first power Evdd of a high voltage level transmitted through the first power line EVDD may be transmitted to the anode and the cathode of the organic light emitting diode OLED. In other words, both ends of the organic light emitting diode OLED including the anode and the cathode may be initialized by the same voltage.

As shown in FIGS. 7 and 9, when the first gate signal Gate1 of the gate-low voltage L is applied through the first gate line GL1 during the emission period, the first switching transistor SW1 and the second switching transistor SW2 may be turned off.

As the first switching transistor SW1 and the second switching transistor SW2 are turned off, discharge of the data voltage stored in the capacitor CST may be carried out, and the discharged data voltage may be applied to the gate electrode of the driving transistor DT. As the data voltage stored in the capacitor CST is applied to the gate electrode of the driving transistor DT, the driving transistor DT may be turned on and, as such, may generate driving current flowable from the first power line EVDD to the second power line EVSS. As a result, the organic light emitting diode OLED may emit light, corresponding to the driving current generated from the driving transistor DT.

Figure 10:
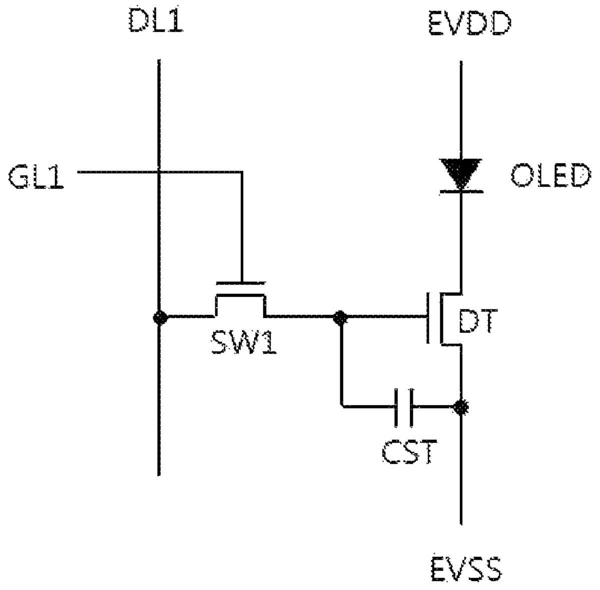
FIG. 10 is a circuit diagram of a circuit configuration of a subpixel according to a comparative example.
Figure 11:
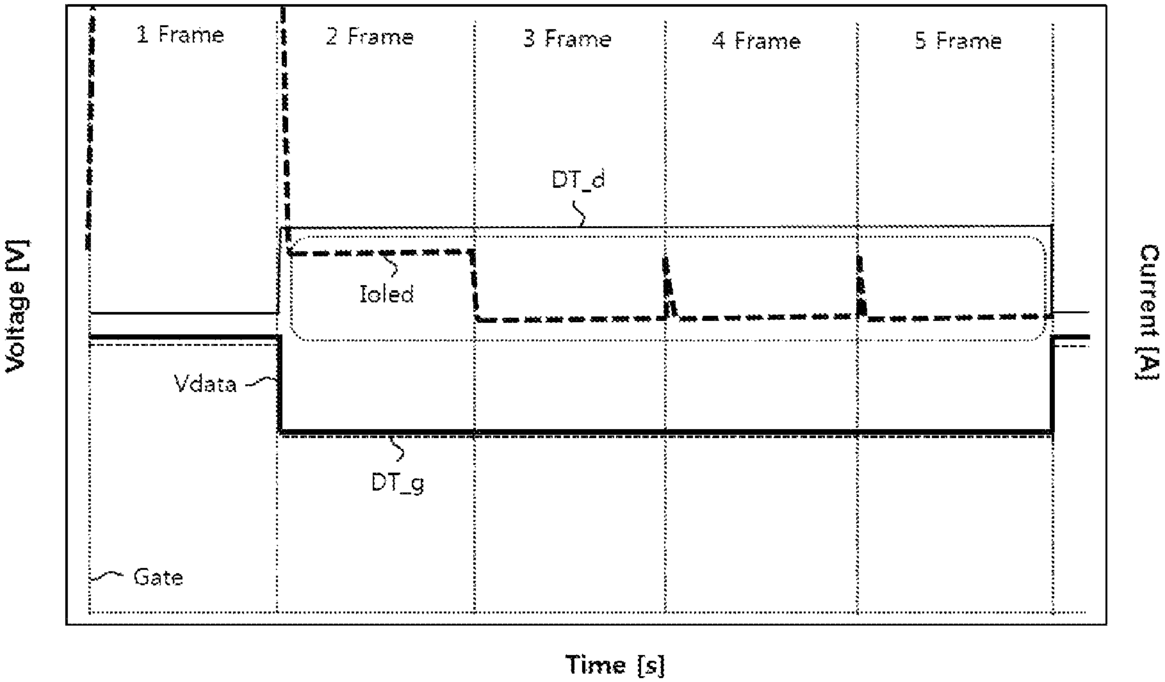
FIGS. 11 and 12 are waveform diagrams comparatively explaining the comparative example and an example of the present disclosure.
Figure 12:
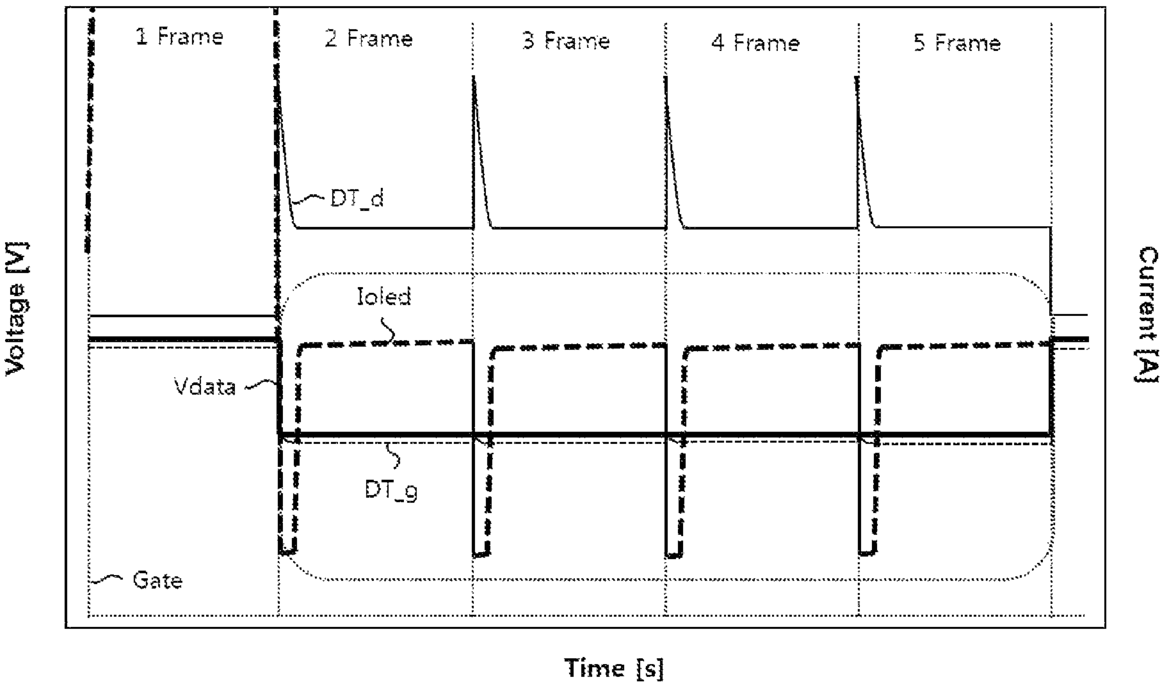

FIG. 10 is a circuit diagram of a circuit configuration of a subpixel according to a comparative example. FIGS. 11 and 12 are waveform diagrams comparatively explaining the comparative example and an example of the present disclosure.

In FIGS. 11 and 12, "Gate" designates a gate signal, "Vdata" designates a data voltage, "DT d" designates a voltage applied to a drain electrode of a driving transistor, "DT g" designates a voltage applied to a gate electrode of the driving transistor, and "holed" represents current flowing through an organic light emitting diode.

FIGS. 11 and 12 illustrate current voltage waveforms exhibited when high-grayscale (255 grayscales) driving is intentionally performed for a first frame 1Frame, and low-grayscale (22 grayscales) driving is then intentionally performed for a period from a second frame 2Frame to a fifth frame 5Frame, in order to compare the comparative example and the example with each other. Meanwhile, it is noted that, in FIGS. 11 and 12, portions of graphs depicting current holed flowing through the organic light emitting diode for the first frame 1Frame extend beyond the graphs and, as such, are not shown because high-grayscale driving has been performed for the first frame 1Frame.

As shown in FIG. 10, although subpixels according to the comparative example and the example are similar to each other, the subpixel according to the comparative example does not include a configuration enabling conduction between both ends of the organic light emitting diode (a second switching transistor). That is, in the subpixel according to the comparative example, there is no configuration or method capable of initializing both ends of an organic light emitting diode OLED during a data writing period.

As a result, in the comparative example, as shown by a rectangular dotted box in FIG. 11, when high-grayscale driving is performed for the first frame 1Frame, a large amount of current (inrush current) may flow for a next frame, that is, the second frame 2Frame, because a high voltage difference is generated between both ends of the organic light emitting diode. The reason why a high voltage difference is generated between both ends of the organic light emitting diode is that the anode of the organic light emitting diode is in a state of being directly connected to a first power line transmitting power of a high voltage level, and a drain node (or cathode) is in a state of a lowered voltage level. As a result, in the comparative example, a problem of degradation in display quality such as abrupt brightness increase, flickering, etc. may occur.

On the other hand, the subpixel according to the example includes a configuration enabling conduction between both ends of the organic light emitting diode (a second switching transistor), as shown in FIGS. 7 to 9. That is, in the subpixel according to the example, there is a configuration or a method capable of initializing both ends of an organic light emitting diode OLED during a data writing period.

As a result, in the example, as shown by a rectangular dotted box in FIG. 12, although high-grayscale driving is performed for the first frame 1Frame, both ends of the organic light emitting diode are initialized by the same voltage and, as such, it may be possible to prevent or reduce a problem in which a large amount of current (inrush current) flows for the next frame due to generation of a high voltage difference between both ends of the organic light emitting diode. As a result, in the example, a problem of a degradation in display quality such as abrupt brightness increase, flickering, etc. can be minimized.

As apparent from the above description, in accordance with the exemplary aspects of the present disclosure, there is an effect in that both ends of an organic light emitting diode are initialized by the same voltage simultaneously with writing of a data voltage and, as such, it may be possible to prevent or reduce a problem in which a large amount of current flows due to generation of a high voltage difference during driving. In addition, in accordance with the exemplary aspects of the present disclosure, it may be possible to minimize a problem of a degradation in display quality such as abrupt brightness increase, flickering, etc. Furthermore, in accordance with the exemplary aspects of the present disclosure, a transistor for writing of a data voltage and a transistor for initialization of both ends of an organic light emitting diode may be controlled by one gate line and, as such, it may be possible to prevent a problem of an increase in bezel occurring when a device required for initialization is configured.

The foregoing description and the accompanying drawings have been presented in order to illustratively explain technical ideas of the present disclosure. A person skilled in the art to which the present disclosure pertains can appreciate that diverse modifications and variations acquired by combining, dividing, substituting, or changing constituent elements may be possible without changing essential characteristics of the present disclosure. Therefore, the foregoing aspects disclosed herein shall be interpreted as illustrative only and not as limitative of the principle and scope of the present disclosure. It should be understood that the scope of the present disclosure shall be defined by the appended claims and all of equivalents thereto fall within the scope of the present disclosure.

What is claimed is:

1. A light emitting display device comprising:

a display panel including a subpixel;

a driver configured to drive the display panel;

an organic light emitting diode disposed in the subpixel and connected with a first power line transmitting a high voltage level;

a first switching transistor configured to write the data voltage;

a second switching transistor configured to initialize the organic light emitting diode;

a capacitor configured to store the data voltage; and a driving transistor configured to supply driving current for driving the organic light emitting diode;

wherein both ends of the organic light emitting diode are initialized simultaneously with writing the data voltage in the subpixel, wherein the capacitor has one end directly connected with a gate electrode of the driving transistor and another end directly connected with a second power line transmitting a low voltage level, wherein the first switching transistor and the second switching transistor are commonly connected to one gate line at gate electrodes of the first and second switching transistors, and wherein the subpixel comprising:

a first step of initializing both ends of the organic light emitting diode by the first power of the high voltage level simultaneously with storing the data voltage in the capacitor disposed in the subpixel; and a second step of enabling the organic light emitting diode to emit light based on the driving current generated from the driving transistor, wherein the first step includes:

turning on a first switching transistor disposed in the subpixel;

turning on a second switching transistor comprised in the subpixel simultaneously with storing a data voltage in the capacitor; and initializing the both ends of the organic light emitting diode by the first power of the high voltage level, and wherein the second step includes:

turning off the first switching transistor and the second switching transistor;

driving the driving transistor based on the data voltage; and enabling the organic light emitting diode to emit light based on the driving current generated from the driving transistor.

2. The light emitting display device according to claim 1, wherein the second switching transistor is connected with an anode and a cathode of the organic light emitting diode.

3. The light emitting display device according to claim 1, wherein the organic light emitting diode having an anode connected to the first power line transmitting first power of the high voltage level and a cathode connected to a first electrode of a driving transistor configured to generate driving current required for driving of the organic light emitting diode.

4. The light emitting display device according to claim 1, a capacitor configured to store the data voltage;

wherein the driving transistor has a gate electrode connected to the second electrode of the first switching transistor and the one end of the capacitor, a first electrode connected to the cathode of the organic light emitting diode, and a second electrode connected to another end of the capacitor and a second power line;

wherein the first switching transistor has a gate electrode connected to the one gate line, a first electrode connected to a data line and a second electrode connected to the one end of the capacitor, wherein the second switching transistor has a gate electrode connected to the one gate line, a first electrode connected to an anode of the organic light emitting diode, and a second electrode connected to a cathode of the organic light emitting diode, and wherein the anode of the organic light emitting diode is connected to the first power line transmitting the high voltage level.

5. A light emitting display device comprising:

a display panel including a subpixel;

a driver configured to drive the display panel;

a timing controller configured to control the driver;

an organic light emitting diode disposed in the subpixel and connected with a first power line transmitting a high voltage level;

a first switching transistor configured to write the data voltage;

a second switching transistor configured to initialize the organic light emitting diode, a capacitor configured to store the data voltage; and a driving transistor configured to supply driving current for driving the organic light emitting diode, wherein both ends of the organic light emitting diode are initialized simultaneously with writing the data voltage in the subpixel, and wherein the capacitor has one end directly connected with a gate electrode of the driving transistor and another end directly connected with a second power line transmitting a low voltage level, wherein the first switching transistor and the second switching transistor are commonly connected to the one gate line at gate electrodes of the first and second switching transistors, and wherein the timing controller configured to perform degradation estimation and compensation for the subpixel based on an algorithm included therein without sensing the subpixel.

6. The light emitting display device according to claim 5, wherein the subpixel comprising:

a first step of initializing both ends of the organic light emitting diode by the first power of the high voltage level simultaneously with storing the data voltage in the capacitor disposed in the subpixel; and a second step of enabling the organic light emitting diode to emit light based on the driving current generated from the driving transistor, wherein the first step includes:

turning on a first switching transistor disposed in the subpixel;

turning on a second switching transistor comprised in the subpixel simultaneously with storing a data voltage in the capacitor; and initializing the both ends of the organic light emitting diode by the first power of the high voltage level, and wherein the second step includes:

turning off the first switching transistor and the second switching transistor;

driving the driving transistor based on the data voltage; and enabling the organic light emitting diode to emit light based on the driving current generated from the driving transistor.

7. The light emitting display device according to claim 5, wherein the driving transistor has a gate electrode connected to the second electrode of the first switching transistor and the one end of the capacitor, a first electrode connected to the cathode of the organic light emitting diode, and a second electrode connected to another end of the capacitor and a second power line.

8. The light emitting display device according to claim 5, wherein the first switching transistor has a gate electrode connected to the one gate line, a first electrode connected to a data line and a second electrode connected to the one end of the capacitor.

9. The light emitting display device according to claim 5, wherein the second switching transistor has a gate electrode connected to the one gate line, a first electrode connected to an anode of the organic light emitting diode, and a second electrode connected to a cathode of the organic light emitting diode.

10. The light emitting display device according to claim 5, wherein the anode of the organic light emitting diode is connected to the first power line transmitting the high voltage level.

* * * * *